Figure 1:
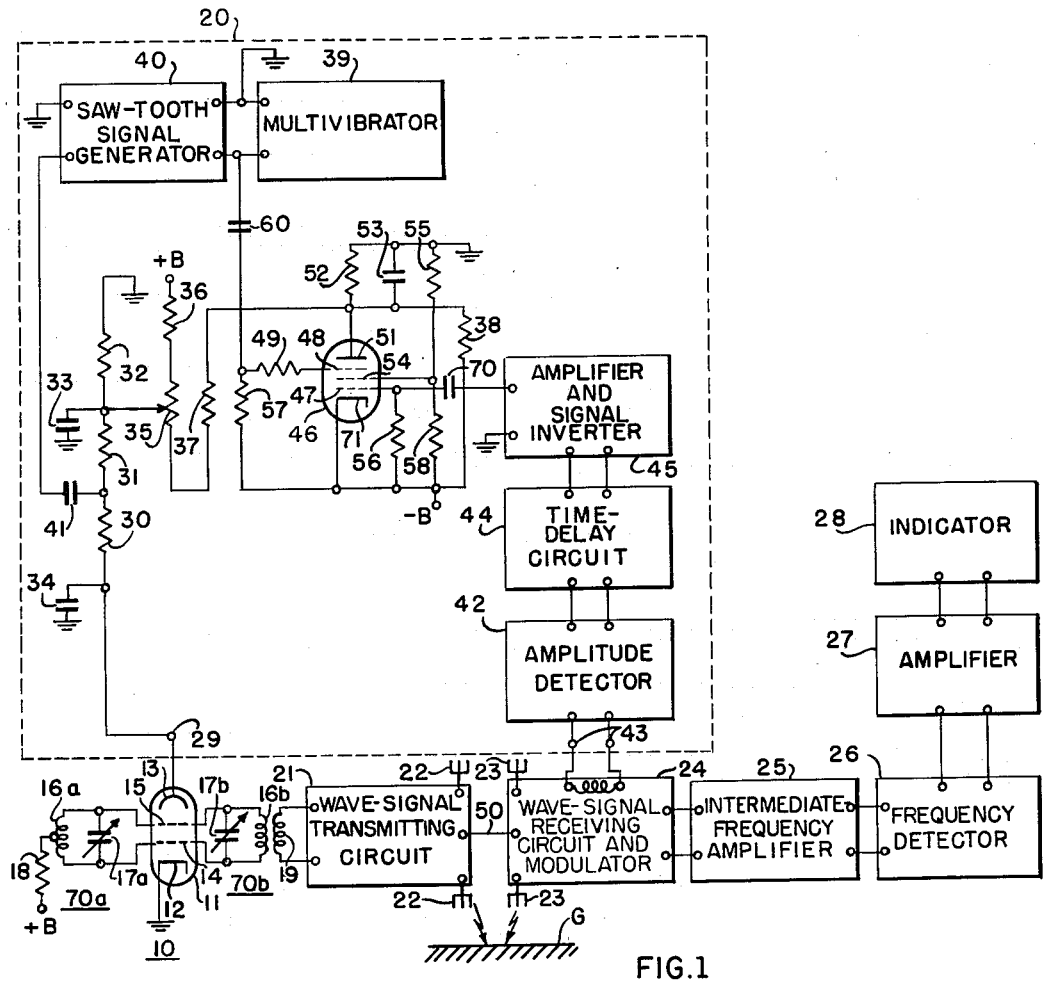

July 24, 1956  W. J. SHANAHAN  2,756,337
FREQUENCY-CONTROL SYSTEM
Filed March 12, 1952  2 Sheets-Sheet 1

Repeller Electrode Voltage (Oscillator Frequency)

INVENTOR.
WILLIAM J. SHANAHAN
BY
Laurence B. Dodds
ATTORNEY

July 24, 1956  W. J. SHANAHAN  2,756,337
FREQUENCY-CONTROL SYSTEM
Filed March 12, 1952  2 Sheets-Sheet 2

INVENTOR.
WILLIAM J. SHANAHAN
BY Laurence B. Dodds
ATTORNEY

2,756,337

FREQUENCY-CONTROL SYSTEM

William J. Shanahan, Long Island City, N. Y., assignor to Hazeltine Research, Inc., Chicago, Ill., a corporation of Illinois Application March 12, 1952, Serial No. 276,175

8 Claims. (Cl. 250—36)

General

This invention relates to frequency-control systems and, particularly, to such control systems for high-frequency oscillators for maintaining the operation of the oscillators within the frequency limits of a selected range of operation. Although the invention has wide application, it is particularly useful in connection with systems employing radiant energy for measuring distances electrically and, hence, will be described in that environment.

One system heretofore proposed for measuring distances by means of transmitted and reflected radiant energy develops in the antenna system of the transmitter a carrier-wave signal the frequency of which is periodically shifted through a predetermined range of frequencies. In the receiver of such a system the signal reflected from the target is caused to heterodyne with the signal radiated from the transmitter to develop a signal the frequency of which represents the distance from the target to the transmitter. By means of conventional frequency-detection and indication systems this distance may be graphically displayed. In such a distance-measuring system the carrier-wave signal usually is of ultra-high frequency, specifically of the order of 3000 or 4000 megacycles. In order to develop such high frequencies, if continuous signal transmission is to be employed, reflex klystron oscillator circuits are conventionally utilized.

The predetermined frequency range over which the radiated signal is caused to vary is normally of the order of 30 megacycles. It is a characteristic of reflex klystron oscillators that each oscillator may operate in several different repeller-voltage ranges, conventionally designated modes, each mode extending over a limited frequency range. For certain of these modes in selected types of klystron oscillators, the frequency range thereof is of the order of 30 megacycles. Therefore, if the carrier-wave signal developed by the oscillator is to be periodically shifted through a 30-megacycle range of frequencies, it becomes desirable so to lock the predetermined frequency shift of the radiated signal within the frequency limits of the operating mode of the klystron as to prevent the klystron from ceasing to oscillate by exceeding the frequency limits of the mode at the extremes of the frequency shift.

Initially it would appear that conventional type of automatic-frequency-control system could be utilized to effect this locking. However, experience has taught that the controlling of a klystron oscillator in frequency, when such oscillator is operating at a frequency of, for example, 4000 megacycles and uncontrolled frequency shifts of more than a megacycle are undesirable, is a difficult problem requiring a complex and bulky automatic-frequency-control system. In addition, not only does the frequency of the oscillator tend to vary, but the frequency limits of the operating mode also vary causing the frequency-control problem to be even more complex.

There are many parameter varations which affect the operating frequency of such a klystron and the frequency limits of an operating mode thereof. These include changes in such atmospheric conditions as temperature, pressure or humidity and variations in the constants of the circuit elements and the operating potentials applied to the oscillator. In view of the multiplicity of these parameters and the fact that similar parameter variations in any simple automatic-frequency-control system would cause such system to be less stable than is desired, it is common practice to permit the klystron randomly to shift in operating frequency and to permit the limits of the mode also to vary. Such random shifting or variation is normally negligible, being a small percentage of the operating frequency, but may be a very large percentage of the systematic shifting of the oscillatory frequency to effect the distance-measuring results previously described. The problem then is, with such klystron oscillator tending to vary in operating frequency in such an uncontrolled manner and the limits of the operating mode also similarly tending to vary with changes in the parameters of the oscillator, to maintain within the varying frequency limits of the operating mode a systematic periodic shift in the frequency of the oscillator over a predetermined frequency range substantially equal to the range of the operating mode. The present invention is directed to a new and improved frequency-control system which effects such result.

It is an object of the invention, therefore, to provide a new and improved frequency-control system for velocity-modulation oscillators which avoids one or more of the above-mentioned disadvantages and limitations of conventional frequency-control systems.

It is another object of the invention to provide a new and improved frequency-control system for high-frequency oscillators which is relatively simple in construction yet one characterized by high reliability of operation over relatively long time intervals without the need of frequent adjustment thereof.

It is a further object of the invention to provide a new and improved frequency-control system for high-frequency oscillators for maintaining a systematic and periodic shift in frequency of the oscillator over a predetermined range of frequencies within the varying frequency limits of the mode in which the oscillator is operating.

It is a still further object of the present invention to provide a new and improved frequency-control system for maintaining the just-mentioned predetermined frequency range within the limits of the operating mode while permitting the mean frequency of the mode to shift in a random manner.

It is still another object of the present invention to provide a new and improved frequency-control system for a klystron oscillator.

In accordance with the present invention, a frequency-control system for a high-frequency velocity-modulated oscillator having an operating frequency range with variable upper and lower frequency limits beyond which the oscillator ceases to generate high-frequency signals comprises a control circuit coupled to the oscillator for causing it normally to operate in the aforementioned frequency range. The system also includes means coupled to the oscillator for supplying a periodic electrical signal to cause it periodically to develop signals within a predetermined range of frequencies, the predetermined range being coextensive with a major portion of the above-mentioned operating range and the electrical signal tending to cause the oscillator to exceed the aforementioned frequency limits of said operating range. The control system also includes an electron-discharge device having an output circuit and a plurality of input circuits individually responsive to the developed signal and the periodic signal for deriving in the aforesaid output circuit a control signal the magnitude of which is representative of substantially the minimum intensities of the developed signal, and a circuit for applying the control signal to the oscillator to maintain its frequency within these limits.

For a better understanding of the present invention, together with other and further objects thereof, reference is had to the following description taken in connection with the accompanying drawings, and its scope will be pointed out in the appended claims.

Figure 2:
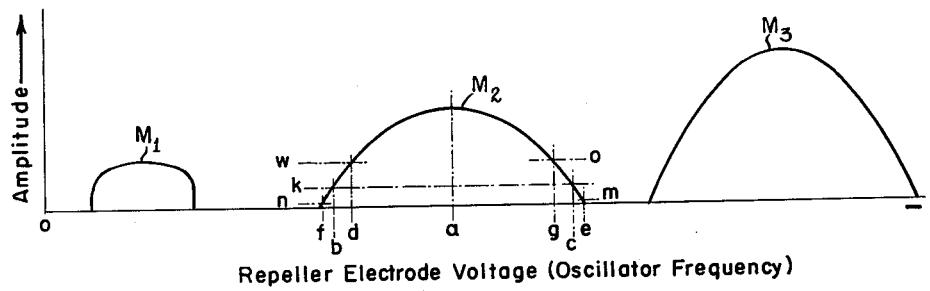
Figure 3:
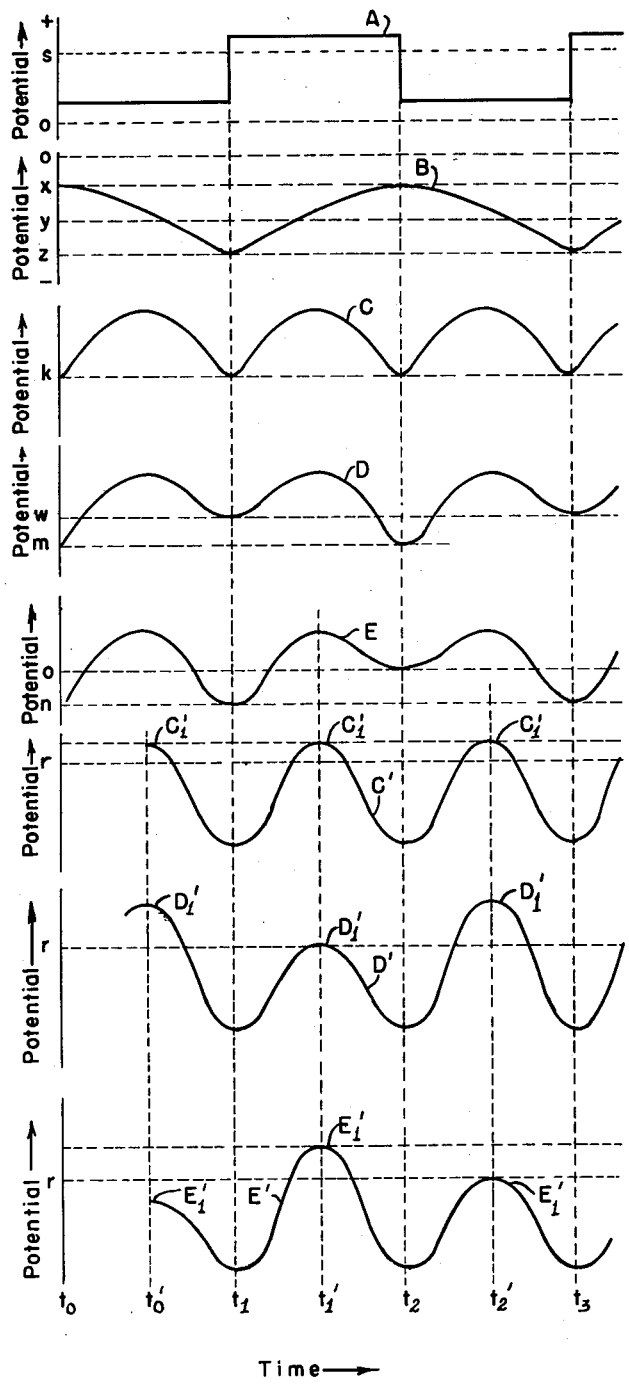

Referring now to the drawings, Fig. 1 is a circuit diagram, partly schematic, of a radiant energy distance-measuring system which includes a frequency-control system in accordance with the present invention; and Figs. 2 and 3 comprise graphs utilized in explaining the operation of this control system.

*General description of distance-measuring system of Fig. 1*

Referring now more particularly to Fig. 1 of the drawings, the distance-measuring system there represented is, specifically, a system for measuring the altitude of an aircraft and is assumed to be mounted in such aircraft traveling at a determinable altitude above the ground G. The measuring system includes a high-frequency velocity-modulated wave-signal oscillator having an operating frequency range with randomly shifting upper and lower frequency limits beyond which the oscillator ceases to generate high-frequency signals. Specifically, such oscillator is a reflex klystron oscillator 10 having a plurality of repeller-voltage modes of operation, each having a limited frequency range. The oscillator 10 has an input circuit comprising a repeller electrode 13 of a klystron tube 11 coupled through a terminal 29 to a frequency-control system 20, in accordance with the present invention, to be described more fully hereinafter. The oscillator 10 also has an output circuit including a pair of buncher electrodes 14 and 15 coupled to a radiating antenna system 22, 22 through a parallel-resonant tuned circuit 70b, a winding 19 and a wave-signal transmitting circuit 21. The circuit 70b, and a similar circuit 70a, each being connected in series with the electrodes 14 and 15 and effectively in parallel with each other, may comprise an inductor and condenser connected in parallel, specifically inductors 16a, 16b and condensers 17a, 17b, as represented, or may be tuned cavity resonators which are integral parts of the klystron tube 11 and which have the characteristics of parallel-resonant circuits. If such resonators are employed, then the winding 19 may be a conventional high-frequency coupling or pickup device. The buncher electrodes 14 and 15 are also coupled to a source of potential +B through the circuit 70a and a resistor 18 coupled to the center of the inductor 16a. The klystron tube 11 also includes a cathode 12 coupled to chassis ground. The wave-signal transmitting circuit 21 may be a conventional means including power amplifier circuits for coupling the output circuit of the klystron oscillator 10 to a radiating system, such as the antenna system 22, 22.

The measuring system also includes a wave-signal receiving circuit and modulator 24 including as an input circuit an antenna system 23, 23. There are coupled in cascade with the unit 24, in the order mentioned, an intermediate-frequency amplifier 25, a frequency detector 26, an amplifier 27 and a distance indicator 28. Units 25—27, inclusive, may be of conventional types and no detailed description thereof is considered necessary. The indicator 28 may comprise a conventional altimeter counter or a cathode-ray tube device for indicating along a base line on the screen thereof the distance between the plane and ground. The wave-signal receiving circuit and modulator 24 may comprise a conventional circuit for intercepting radiated signals and an input circuit including a conductor 50 coupled between the transmitter 21 and the unit 24 to apply to a mixer circuit in the unit 24 a low-power portion of the radiated signal as a local oscillator signal.

*General explanation of operation of distance-measuring system of Fig. 1*

Considering now the operation of the distance-measuring system of Fig. 1, specifically, to measure the altitude of a plane above ground, the reflex klystron 10 under the control of the control system 20, in a manner to be explained more fully hereinafter, develops a high-frequency signal, for example, a signal having a frequency of the order of 4300 megacycles which is periodically shifted in frequency over a predetermined range of frequencies, for example, by ±15 megacycles. This signal of periodic varying frequency is radiated from the antenna system 22, 22 after being translated through the winding 19 and the transmitter 21. A portion of the developed signal is also translated through the conductor 50 to the modulator or mixer portion of the unit 24.

The radiated signal after reflection from the ground G, as indicated, is intercepted by the receiving antenna system 23, 23. The intercepted signal is caused to heterodyne in the unit 24 with the signal translated over the conductor 50 to develop an intermediate-frequency signal the instantaneous frequency of which is an indication of the altitude of the plane. The frequency of the signal is such an indication because in a system in which the local oscillator frequency is periodically varied with time, the time of travel of a radiated signal of a given frequency to an object and back will determine the difference in frequency between the reflected signal and the signal being developed in the local oscillator circuit at the time the reflected signal is intercepted. The signal developed in the unit 24 is then translated through the amplifier 25 and a unidirectional signal the potential of which is representative of the frequency of the signal applied thereto is derived in the detector 26. The latter signal is then further amplified in the unit 27 and utilized to control the display of the indicator 28 to indicate the altitude of the plane.

*Description of frequency-control system of Fig. 1*

Referring now particularly to the control system 20 of Fig. 1, this system includes a control circuit coupled to the oscillator 10 for causing the oscillator normally to operate within a selected frequency range. More specifically, the control circuit comprises a voltage-divider circuit including fixed resistors 36, 37 and 38 and a variable resistor 35 connected in series across a source of potential the terminals of which are represented as +B and −B. In addition, the control circuit includes a pair of fixed filtering resistors 30 and 31 coupled in series between the adjustable tap of the resistor 35 and the terminal 29. As previously mentioned, the terminal 29 is coupled to the repeller electrode 13 of the klystron tube 11. The junction of the resistors 31 and 35 is coupled to chassis ground through a parallel-connected circuit including a resistor 32 and a by-pass condenser 33 to permit the potentials +B and −B to be positive and negative, respectively, with relation to chassis ground. In addition, the junction of the resistor 30 and the terminal 29 is coupled to ground through a by-pass condenser 34. The condensers 33 and 34 are proportioned to translate the chassis ground all signal energy having frequencies higher than that of the saw-tooth signal developed in a generator 40, to be described more fully hereinafter.

The frequency-control system also includes means coupled to the oscillator 10 for supplying a periodic electrical signal to cause it periodically to develop signals within a predetermined range of frequencies where the predetermined range is coextensive with a major portion of the preselected stable operating range thereof. More specifically, this supplying means comprises a multivibrator 39 and the saw-tooth signal generator 40 coupled in series, the output circuit of the generator 40 being coupled through a condenser 41 to the junction of the resistors 30 and 31. The multivibrator 39 may be a conventional type of square-wave generator for periodically developing pulse signals having, for example, a period of operation of approximately 1000 cycles and having such parameters as to develop square waves of approximately 200 volts peak-to-peak. The generator 40 also may be of a conventional type including an integrating circuit for developing a saw-tooth potential from the pulse signals developed in the unit 39 and, in addition, may also include, if desired, a wave-shape modifying circuit comprising another integrating circuit coupled in series with the first integrating circuit and proportioned to round off the positive and negative peak portions of the saw-tooth wave.

The frequency-control system also includes means responsive to the signals developed in the output circuit of the oscillator 10 for deriving a control signal from those of the developed signals which have frequencies substantially corresponding to the frequency limits of the preselected stable operating range. More specifically, this responsive means includes an electron-discharge device, specifically, a pentode vacuum tube 46 having a plurality of electrodes including an anode 51, a pair of control electrodes 47 and 48, a screen electrode 54 and a cathode 71. The circuit including the tube 46 is a coincidence mixer circuit and has means for developing potentials on each of the electrodes 47 and 48 for causing the tube 46 to be normally nonconductive. Specifically, the latter means for the electrode 47 is a conventional biasing network including a resistor 56 connected between the electrode 47 and the cathode 71 and a condenser 70 coupled between the electrode 47 and an amplifier and signal inverter 45. The time constant of the circuit including the resistor 56 and the condenser 70 is such as normally to effect biasing of the electrode 47 substantially at the potential of the positive peaks of the signals translated through the condenser 70 and applied to the electrode 47. The biasing network for the electrode 48 includes the series-connected resistors 49 and 57 connected between the electrode 48 and the cathode 71 and a condenser 60 coupled between the junction of the resistors 49 and 57 and an output circuit of the multivibrator 39. The time constant of the circuit including the resistor 57 and the condenser 60 is proportioned to effect biasing of the electrode 48 substantially at the potential of the positive peaks of the signals applied thereto. The condenser 60 also comprises means for applying the pulse signals developed in the unit 39 to the control electrode 48 for periodically developing such a potential on the electrode 48 as to condition the tube 46 to be conductive during a predetermined period of time, specifically, during the occurrence of the peak portion of a positive pulse signal developed in the unit 39.

The responsive means also includes means for applying the signals developed in the transmitter including the oscillator 10 to the control electrode 47 of the tube 46 normally for periodically developing such a potential on the control electrode 47, during the application of the one of the developed signals which has a frequency substantially corresponding to one of the above-mentioned frequency limits and which occurs during the above-mentioned period of time, as to derive a control signal on the anode 51 having a magnitude related to the magnitude of the aforesaid one of the developed signals. The latter means for applying the signals developed in the transmitter includes, in cascade, between an output circuit of the unit 24 coupled to a pair of terminals 43, 43 and the control electrode 47, in the order mentioned, an amplitude detector 42, a time-delay circuit 44, the unit 45 and the condenser 70.

The anode 51 of the tube 46 is coupled to the junction of the resistors 37 and 38 and to chassis ground through a time-constant circuit including a resistor 52 and a condenser 53 connected in parallel. The time constant of the latter circuit is such as to permit the anode 51 to develop a stable control signal at a rate proportional to the frequency of the saw-tooth generator 40. The screen electrode 54 is connected to the junction of a pair of series-connected resistors 55 and 58 coupled between a potential —B and chassis ground to develop a potential on the screen electrode 54 which is negative with respect to chassis ground but positive with respect to the cathode 71. The cathode 71 is directly connected to the source of potential —B and a resistor 38 is connected between the anode 51 and the source of potential —B to prevent the excursions of the anode potential from being excessive.

The frequency-control system also comprises a circuit for applying the control signal developed in the arrangement including the tube 46 to the oscillator 10 to maintain the frequency thereof within the limits of the preselected stable operating frequency range. More specifically, this circuit for applying the control signal comprises the conductive connection between the anode circuit of the tube 46, including the resistor 52 and the condenser 53, and the junction of the resistors 37, 38 in the control circuit.

*Explanation of operation of frequency-control system of Fig. 1*

Before considering the operation of the control system 20 in detail, it will be helpful briefly to consider some of the characteristics of klystron oscillators such as the oscillator 10. It is a characteristic of such oscillators that each thereof may operate in several different repeller-voltage ranges, conventionally designated modes, each mode extending over a limited frequency range. Thus, referring to Fig. 2 of the drawings, the oscillator 10 may operate in the modes represented by the characteristic curves $M_1$, $M_2$ and $M_3$ of these modes. These curves are plots of the power or signal amplitude developed in the output circuit of the oscillator for signals of different frequencies within the frequency limits of each mode. The mode of operation for the oscillator and the frequency of operation within the mode, all other parameters remaining constant, are determined by the voltage applied to the repeller electrode 13. As this voltage changes within well-defined limits, the operating frequency of the oscillator changes within the selected mode and the amplitude of the output signal developed varies from a minimum at one limit of the mode through a maximum at a point substantially in the middle of the mode to another minimum at the other limit thereof. Any radical change in the repeller voltage will cause the oscillator to exceed the limits of the selected mode and to cease oscillating or to start oscillating in another mode.

Having selected a mode of operation for the oscillator, if it is desired periodically to shift the frequency of the oscillator through a predetermined range of frequencies, it is desirable to maintain the limits of this range of frequencies within the frequency limits of the operating mode. Since, as has been previously explained herein, parameters other than the repeller electrode voltage also control the frequency of the oscillator and the frequency limits of any selected mode, it becomes very desirable to lock the frequency limits of the predetermined frequency range within the varying frequency limits of the selected oscillator mode. The control system of Fig. 1 effects such result.

The variable tap of the resistor 35 is adjusted to apply a desired negative voltage through the resistors 30 and 31 and the terminal 29 to the repeller electrode 13 to determine the mode of the oscillator 10. If it is desired to operate in the mode represented by the curve $M_2$ of Fig. 2, the positioning of the variable tap of the resistor 35 is adjusted, for example, to approximately —70 volts to cause the oscillator 10 to operate at a frequency which is substantially in the center $a$ of the selected mode. As will be explained more fully hereinafter, the adjustment of the variable tap of the resistor 35 depends also on the control-signal voltage developed in the anode circuit of the tube 46.

The rectangular wave developed in the multivibrator 39 and represented by curve A of Fig. 3 is applied to the generator 40 wherein it is integrated to form a saw-tooth signal. The peak and null points of the saw-tooth signal are rounded in the unit 40 to develop a modified saw-tooth signal as represented by curve B of Fig. 3. This saw-tooth signal having a peak-to-peak, $x$ level to $z$ level, voltage of, for example, 5 volts is translated through the condenser 41, the resistor 30 and the terminal 29 and applied to the repeller electrode 13. The filter condenser 34 tends to translate to ground any signal energy having a frequency higher than the periodicity of the saw-tooth signal. The saw-tooth signal represented by curve B causes the voltage of the repeller electrode 13 to vary between the two voltage limits $x$ and $z$ for example between $-67.5$ and $-72.5$ volts, respectively. If the voltage applied to the repeller electrode 13 from the variable resistor 35 is represented by the voltage $a$ in Fig. 2 and by the mean amplitude level $y$ of curve B of Fig. 3, then the oscillator 10 will operate between the frequency limits $b$ and $c$ as represented in curve $M_2$ of Fig. 2, the portion of the saw-tooth signal having amplitude $x$ causes the oscillator to operate at the frequency $b$ whereas the portion of the saw-tooth signal having amplitude $z$ causes the oscillator to operate at the frequency $c$. Such operation is desirable since the frequency shift $b$—$c$ of the oscillator 10 is maintained within the maximum frequency limits of the mode $M_2$.

When so operated, the oscillator 10 develops a group of carrier-wave signals having an envelope represented by curve C of Fig. 3. This envelope indicates that the radiated signals vary in power with the variation in frequency of the oscillator 10 having substantially maximum power when the oscillator 10 is operating in the center of the mode with a repeller electrode voltage $a$ and minimum power when the oscillator 10 is operating at the frequency limits $b$ and $c$. It is seen that the signals having the frequencies $b$ and $c$ have equal power since the portions of curve C representative of both of these signals occur at an amplitude level $k$.

In addition to being radiated by the antenna system 22, 22, this group of signals is translated along the conductor 50 and utilized as local oscillator signals in the unit 24. The amplitudes of these local oscillator signals are detected in the unit 42, delayed in time in the unit 44 by an amount $t_0'-t_0$ and amplified and inverted in phase in the unit 45 to develop signals having the wave form represented by curve C'. This group of signals is applied to the control electrode 47 of the tube 46 and is so controlled by the amplifier 45 as to be of such amplitude as to condition the tube 46 to conduct current only when some of the signals represented by curve C' exceed the cutoff level $r$ of the electrode 47. With respect to curve C', it should be noticed that the portions C'$_1$ of the curve are the null portions of the curve C after the signals represented by curve C have been delayed in time and inverted by 180°. This the portions C$_1'$ are representative of the low-power points of the signals represented by curve C. It should also be noticed that each of these low-power points exceeds the cutoff level $r$ by approximately the same amount.

The rectangular pulse signals developed in the multivibrator 39 are translated through the condenser 60 and the resistor 49 and applied to the control electrode 48 of the tube 46. Due to the clamping action of the resistor 57, only those portions of the pulse signals exceeding the level $s$, as indicated with respect to curve A of Fig. 3, condition the tube 46 to conduct. Thus, the upper elevel of each positive pulse conditions the tube 46 to conduct. When both the electrodes 47 and 48 condition the tube to conduct at the same time, current flows in the anode circuit thereof and a control signal is developed. Thus, when a portion C$_1'$ of curve C' coincides with the positive pulse of curve A, a control voltage of a predetermined amount is developed in the anode circuit of the tube 46 and effectively causes the unidirectional voltage applied from the variable resistor 35 to change by the amount of the control voltage. When the frequency limits of the predetermined frequency range are within the limits of the mode $M_2$, as represented by the frequency limits $b$ and $c$, the control voltage developed at the tube 46 combines with the voltage that is developed at the variable tap of the resistor 35 without the presence of such control voltage and determined the repeller voltage $a$, as represented in Fig. 2.

If, for any of the number of reasons previously discussed, the saw-tooth signal developed in the generator 40 tends to cause the oscillator 10 to operate over a frequency range such that one of the limits of the range tends to exceed the limits of the operating mode represented by curve $M_2$, then a correcting control voltage is developed in the anode circuit of the tube 46 to cause the frequency limits of the preselected range to remain within the limits of the operating mode. This control voltage amounts to the developing of a new mean unidirectional repeller electrode voltage related to the voltage $a$ about which the saw-tooth signal voltage varies. For example, if the voltage level $x$ of the saw-tooth wave represented by curve B of Fig. 3 tends to develop a repeller voltage such that the oscillator operates at the frequency represented by $d$ of Fig. 2 and the level $z$ of the saw-tooth signal tends to cause the oscillator to operate at a frequency represented by $e$, then a group of output signals having an envelope as represented by curve D of Fig. 3 is developed. It is seen that alternate null points of the envelope represented by curve D occur at similar levels, for example at a level $w$, while the interleaving null points occur at another level, for example at a level $m$. This variation in the amplitude levels of the null points of the curve D is caused by the saw-tooth potential represented by the level $z$ effecting the development in the oscillator 10 of signals having an amplitude level represented by the level $m$ at the frequency $e$, as represented in Fig. 2 and with relation to curve D, while the saw-tooth voltage $x$ causes signals having the level $w$ at the frequency $d$ to be developed. When the group of signals represented by curve D is amplitude detected in the unit 42, delayed in time by the unit 44 and amplified and inverted in the unit 45, the envelope thereof assumes the form represented by curve D' of Fig. 3. With respect to such curve, it is apparent that the low-power radiated signals, as represented by the portions D$_1'$ of curve D', do not occur at a common amplitude level and that the signals, represented by the portion D$_1'$ which occurs in coincident with the positive pulse represented by curve A of Fig. 3, are not of sufficient amplitude to exceed the cutoff level $r$ of the electrode 47 of the tube 46. Therefore, no current flows in the tube 46 at this time and there is no loading effect in the anode circuit thereof. As a result, since the time constant of the circuit including the elements 52 and 53 is such, as previously described, as to permit the potential developed thereacross at approximately this time to become substantially that of the point on the voltage divider coupled to the anode, a more positive potential is developed in the anode and is effectively applied to the repeller electrode 13 in the manner previously described to shift the mean potential thereof in a more positive direction until the frequency limits $d$ and $e$ assume positions in the mode represented by curve $M_2$ similar to those of the limits $b$ and $c$, respectively.

If the change in parameters causes one of the frequency limits of the predetermined frequency shift to tend to exceed the other or lower frequency limit of the mode represented by curve $M_2$, a correcting control voltage is likewise developed in the anode circuit of the tube 46 to cause the signals developed at the limits of the predetermined frequency shift to have substantially equal amplitudes and to have frequencies within the frequency limits of the operating mode. For example, if the voltage level $x$ of the saw-tooth wave represented by curve B tends to cause the oscillator to operate at the frequency represented by $f$ of Fig. 2 and the level $z$ of the saw-tooth signal tends to cause the oscillator to operate at a frequency represented by $g$, then a group of output signals having an envelope as represented by curve E of Fig. 3 is developed. The null points of this curve representative of the signals having a frequency $g$ have an amplitude level $o$ while the null points representing the signals having a frequency $f$ have an amplitude level $n$. When the group of signals having the envelope represented by curve E is amplitude detected in the unit 42, delayed in time by the unit 44 and amplified and inverted in the unit 45, it appears as represented by curve E' of Fig. 3. It is apparent that the low-power signals represented by the portions $E_1'$ do not occur at a common amplitude level and that the signals, represented by the portion $E_1'$ which occurs in coincidence with the positive pulse represented by curve A of Fig. 3, are of much greater amplitude than the amplitude of the similar signals represented by the curve C'. Therefore, a large current flows in the anode circuit of the tube 46 at this time causing the anode potential to become lower or more negative. The lowering in the potential of the anode of the tube 46 causes the main potential applied to the repeller electrode 13 of the oscillator tube 11 to be lowered or made more negative by a similar amount, thereby causing the center position of the predetermined frequency shift to be moved to a higher frequency so that the frequency limits $f$ and $g$ assume positions in the mode $M_2$ similar to those of the frequencies $b$ and $c$.

While applicant does not intend to be limited to any particular circuit values in the embodiment of the invention described, there follows a set of circuit values which have been found to be particularly suitable for a frequency-control system of the type represented by Fig. 1.

| | |
|---|---|
| Resistor 18 | 100 ohms. |
| Resistors 30, 35, 49, 57 and 58. | 1000 ohms. |
| Resistor 31 | 10,000 ohms. |
| Resistor 32 | 3300 ohms. |
| Resistor 36 | 4700 ohms. |
| Resistors 37 and 52 | 470,000 ohms. |
| Resistor 38 | 220,000 ohms. |
| Resistor 55 | 100,000 ohms. |
| Resistor 56 | 33,000 ohms. |
| Condenser 33 | .1 microfarad. |
| Condenser 34 | 200 micromicrofarads. |
| Condensers 41, 53, 60 and 70. | .01 microfarad. |
| Klystron tube 11 | Type 2K56. |
| Tube 46 | Type 5784. |
| Potential +B | +300 volts to chassis ground. |
| Potential −B | −150 volts to chassis ground. |
| Frequency of signal generated by klystron. | Approx. 4300 megacycles. |

It will be apparent from the foregoing description that a frequency-control system in accordance with the present invention does not tend to maintain constant the randomly shifting frequency of an oscillator operating in a frequency mode which has frequency limits also tending to shift in a random manner. The present frequency-control system permits such random shifting and tends to maintain the limits of a periodic predetermined frequency shift within the varying frequency limits of the mode by periodically determining the amplitudes of the signals developed at the frequency limits of the predetermined shift and by developing therefrom a control voltage for application to the oscillator to cause the oscillator to operate in such manner that the last-mentioned signals have substantially equal amplitudes. In this manner the frequency limits of the periodic predetermined frequency shift are prevented from exceeding the frequency limits of the operating mode of the oscillator.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A frequency-control system for a reflex klystron oscillator including a repeller electrode and having an operating frequency range with variable upper and lower frequency limits beyond which the oscillator ceases to generate high-frequency signals comprising: a control circuit including a voltage-divider circuit coupled to said repeller electrode for applying a potential thereto for causing said oscillator normally to operate in said frequency range; a multivibrator for periodically developing a pulse signal; a saw-tooth signal generator coupled to said voltage-divider circuit and to said multivibrator for supplying a saw-tooth potential to vary the magnitude of said first-mentioned potential to cause said oscillator periodically to develop a signal within a predetermined range of frequencies having minimum intensities substantially at the extremes of said range, said predetermined range being coextensive with a major portion of said operating range and said saw-tooth potential tending to cause said oscillator to exceed said frequency limits of said operating range, an electron-discharge device having a plurality of electrodes including an anode and a pair of control electrodes and having means for developing potentials on each of said control electrodes for causing said device to be normally nonconductive; means for applying said pulse signal to one of said control electrodes for periodically developing such a potential on said one control electrode as to condition said device to be conductive during a predetermined period of time; means for applying said developed signal to the other of said control electrodes normally for periodically developing such a potential on said other control electrode, during the application of the component of said developed signal which has a frequency substantially corresponding to one of said frequency limits of said operating range and which occurs during said period of time, as to derive a control signal on said anode having a magnitude related to the magnitude of said component of said developed signal; and a circuit for applying said control signal to said oscillator to maintain the frequency thereof within said limits.

2. A frequency-control system for a high-frequency velocity-modulated oscillator having an operating frequency range with variable upper and lower frequency limits beyond which the oscillator ceases to generate high-frequency signals comprising: a control circuit coupled to said oscillator for causing it normally to operate in said frequency range; means coupled to said oscillator for supplying a periodic electrical signal to cause it periodically to develop a signal within a predetermined range of frequencies having minimum intensities substantially at the extremes of said range, said predetermined range being coextensive with a major portion of said operating range and said electrical signal tending to cause said oscillator to exceed said frequency limits of said operating range; a coincidence-mixer circuit responsive to said developed signal and said periodic signal for deriving a control signal the magnitude of which is representative of substantially the minimum intensities of said developed signal; and a circuit for applying said control signal to said oscillator to maintain the frequency thereof within said limits.

3. A frequency-control system for a high-frequency velocity-modulated oscillator having an operating frequency range with variable upper and lower frequency limits beyond which the oscillator ceases to generate high-frequency signals comprising: a control circuit coupled to said oscillator for causing it normally to operate in said frequency range; means coupled to said oscillator for supplying a periodic electrical signal to cause it periodically to develop a signal within a predetermined range of frequencies having minimum intensities substantially at the extremes of said range, said predetermined range being coextensive with a major portion of said operating range and said electrical signal tending to cause said oscillator to exceed said frequency limits of said operating range; an electron-discharge device having an output circuit and a plurality of input circuits individually responsive to said developed signal and said periodic signal for deriving in said output circuit a control signal the magnitude of which is representative of substantially the minimum intensities of said developed signal; and a circuit for applying said control signal to said oscillator to maintain the frequency thereof within said limits.

4. A frequency-control system for a high-frequency velocity-modulated oscillator having an operating frequency range with variable upper and lower frequency limits beyond which the oscillator ceases to generate high-frequency signals comprising: a control circuit coupled to said oscillator for causing it normally to operate in said frequency range; means for developing a periodic pulse signal; a saw-tooth signal generator coupled to said oscillator and to said pulse-signal developing means for supplying a saw-tooth signal to cause said oscillator periodically to develop a signal within a predetermined range of frequencies having minimum intensities substantially at the extremes of said range, said predetermined range being coextensive with a major portion of said operating range and said saw-tooth signal tending to cause said oscillator to exceed said frequency limits of said operating range; an electron-discharge device having a plurality of electrodes including an anode and a pair of control electrodes and having means for developing potentials on each of said control electrodes for causing said device to be normally nonconductive; means for applying said pulse signal to one of said control electrodes for periodically developing such a potential on said one control electrode as to condition said device to be conductive during a predetermined period of time; means for applying said developed signal to the other of said control electrodes normally for periodically developing such a potential on said other control electrode, during the application of the component of said developed signal which has a frequency substantially corresponding to one of said frequency limits of said operating range and which occurs during said period of time, as to derive a control signal on said anode having a magnitude related to the magnitude of said component of said developed signal; and a circuit for applying said control signal to said oscillator to maintain the frequency thereof within said limits.

5. A frequency-control system for a high-frequency velocity-modulated oscillator having an operating frequency range with variable upper and lower frequency limits beyond which the oscillator ceases to generate high-frequency signals comprising: a control circuit including a voltage-divider circuit coupled to said oscillator for applying a potential thereto for causing said oscillator normally to operate in said frequency range; means for developing a periodic pulse signal; a saw-tooth signal generator coupled to said voltage-divider circuit and to said pulse-signal developing means for supplying a saw-tooth potential to cause said oscillator periodically to develop a signal within a predetermined range of frequencies having minimum intensities substantially at the extremes of said range, said predetermined range being coextensive with a major portion of said operating range and said saw-tooth potential tending to cause said oscillator to exceed said frequency limits of said operating range; an electron-discharge device having a plurality of electrodes including an anode and a pair of control electrodes and having means for developing potentials on each of said control electrodes for causing said device to be normally nonconductive; means for applying said pulse signal to one of said control electrodes for periodically developing such a potential on said one control electrode as to condition said device to be conductive during a predetermined period of time; means for applying said developed signal to the other of said control electrodes normally for periodically developing such a potential on said other control electrode, during the application of the component of said developed signal which has a frequency substantially corresponding to one of said frequency limits of said operating range and which occurs during said period of time, as to derive a control signal on said anode having a magnitude related to the magnitude of said component of said developed signal; and a circuit for applying said control signal to said oscillator to maintain the frequency thereof within said limits.

6. A frequency-control system for a high-frequency velocity-modulated oscillator having an operating frequency range with variable upper and lower frequency limits beyond which the oscillator ceases to generate high-frequency signals comprising: a control circuit coupled to said oscillator for causing it normally to operate in said frequency range; a multivibrator for developing a periodic pulse signal; a saw-tooth signal generator coupled to said oscillator and to said multivibrator for developing from said pulse signal a saw-tooth signal to cause said oscillator periodically to develop a signal within a predetermined range of frequencies having minimum intensities substantially at the extremes of said range, said predetermined range being coextensive with a major portion of said operating range and said saw-tooth signal tending to cause said oscillator to exceed said frequency limits of said operating range; an electron-discharge device having a plurality of electrodes including an anode and a pair of control electrodes and having means for developing potentials on each of said control electrodes for causing said device to be normally nonconductive; means for applying said pulse signal to one of said control electrodes for periodically developing such a potential on said one control electrode as to condition said device to be conductive during a predetermined period of time; means for applying said developed signal to the other of said control electrodes normally for periodically developing such a potential on said other control electrode, during the application of the component of said developed signal which has a frequency substantially corresponding to one of said frequency limits of said operating range and which occurs during said period of time, as to derive a control signal on said anode having a magnitude related to the magnitude of said component of said developed signal; and a circuit for applying said control signal to said oscillator to maintain the frequency thereof within said limits.

7. A frequency-control system for a high-frequency velocity-modulated oscillator having an operating frequency range with variable upper and lower frequency limits beyond which the oscillator ceases to generate high-frequency signals comprising: a control circuit coupled to said oscillator for causing it normally to operate in said frequency range; means coupled to said oscillator for supplying a periodic electrical signal to cause it periodically to develop a signal within a predetermined range of frequencies and having a peak intensity substantially in the middle of said range and mean intensities at the extremes thereof, said predetermined range being coextensive with a major portion of said operating range and said electrical signal tending to cause said oscillator to exceed said frequency limits of said operating range; means responsive to said developed signal for deriving a signal having peaks representative of the minimum intensities of said developed signal; means jointly responsive to said derived signal and said periodic signal for developing a control signal representative of the magnitudes of said mean intensities; and a circuit for applying said control signal to said oscillator to maintain the frequency thereof within said limits.

8. A frequency-control system for a high-frequency velocity-modulated oscillator having an operating frequency range with variable upper and lower frequency limits beyond which the oscillator ceases to generate high-frequency signals comprising: a control circuit coupled to said oscillator for causing it normally to operate in said frequency range; means for developing a periodic pulse signal; means responsive to said pulse signal and coupled to said oscillator for supplying a saw-tooth signal to cause said oscillator periodically to develop a high-frequency signal within a predetermined range of frequencies and having a peak intensity substantially in the middle of said range and mean intensities at the extremes thereof, said predetermined range being coextensive with a major portion of said operating range and said saw-tooth signal tending to cause said oscillator to exceed said frequency limits of said operating range; means responsive to said high-frequency signal for deriving a signal having peaks representative of the minimum intensities of said high-frequency signal; means jointly responsive to said derived signal and said pulse signal for developing a control signal representative of the magnitude of said mean intensities; and a circuit for applying said control signal to said oscillator to maintain the frequency thereof within said limits.

References Cited in the file of this patent

UNITED STATES PATENTS

| | | |
|---|---|---|
| 2,114,036 | Smith et al. | Apr. 12, 1938 |
| 2,296,962 | Tunick | Sept. 29, 1942 |
| 2,475,074 | Bradley et al. | July 5, 1949 |
| 2,547,890 | Rubin | Apr. 3, 1951 |
| 2,583,023 | Spangenberg | Jan. 22, 1952 |
| 2,617,040 | Bailey | Nov. 4, 1952 |